United States Patent [19]

Bengtsson

[11] 3,964,577

[45] June 22, 1976

[54] AUTOMATED HANDLING SYSTEM FOR BANK DEPOSIT BOXES

[75] Inventor: Sture B. Bengtsson, Goteborg, Sweden

[73] Assignee: Robur Konsult AB, Goteborg, Sweden

[22] Filed: Aug. 12, 1974

[21] Appl. No.: 496,835

[30] Foreign Application Priority Data

Aug. 22, 1973 Sweden .............................. 7311405

[52] U.S. Cl. .............................. 186/1 R; 186/1 B; 214/16.4 A

[51] Int. Cl.² .............................. B65G 1/06

[58] Field of Search ................ 186/1 R, 1 B, 1 D, 7, 186/22, 28; 214/16.4 A, 16.1 DB

[56] References Cited

UNITED STATES PATENTS

| | | | |
|---|---|---|---|
| 1,819,491 | 8/1931 | White | 186/1 R |
| 3,473,675 | 10/1969 | Goldammer | 214/16.A X |
| 3,526,326 | 9/1970 | Castaldi | 214/16.4 A |
| 3,770,147 | 11/1973 | Kito | 214/16.4 A |

OTHER PUBLICATIONS

The Randtriever—M H System; Remington Rand Systems Division; Marietta, Ohio, June 5, 1970.

*Primary Examiner*—Albert J. Makay
*Assistant Examiner*—George F. Abraham
*Attorney, Agent, or Firm*—Sherman & Shalloway

[57] ABSTRACT

In a system for the automatic programmed handling of coded safety deposit boxes and other objects having book receiving members and stored in a storage room having rows of shelves, the improvement which comprises stacking means movable along said shelves for the removal and insertion of said boxes, gripping means movably mounted on said stacking means for movement in the vertical direction and on the horizontal plane for removal and insertion of said boxes, said gripping means including hook means for communication with said hook receiving means of said boxes for transporting said boxes, programming means cooperating with said stacking means and said gripping means for automatically directing said stacking means and said gripping means to desired box by way of a predetermined program, said programming means including control means for keying-in the desired box and initiating box hand-out and hand-in positions, and at least one issuing and receiving opening disposed adjoiningly in the wall of said storage room for receiving and returning said boxes, whereby upon receipt of instructions by the programming means of the desired box, the stacking means is actuated and moves automatically along the shelves to the proper position, the gripping means at the proper location engages or disengages the hook means and the hook receiving means in the box hand-out and hand-in positions and delivers or retrieves the box at the issuing and receiving openings.

21 Claims, 17 Drawing Figures

AUTOMATED HANDLING SYSTEM FOR BANK DEPOSIT BOXES

This invention relates to a system for the automated handling of bank deposit boxes or other objects stored in a bank vault or other storage room for displacing said boxes or objects from a storage position to a position for their hand-out or, vice versa, from a position of their hand-in back to the same or another storage position.

In connection with bank offices, vaults are usually constructed for the storage and protection of different types of bank valuables. In most cases, some part of the vault, or a separate vault, is fitted with compartments containing insert boxes, which are let to private persons and companies for the storage of valuable documents and objects in said boxes. The protection granted in the vault, primarily against burglary and fire, is as good for the customers' as for the bank's own valuables.

For reasons of easy accessibility, however, the compartments with insert boxes can be constructed only as high as the normal eye-level and, therefore, the vault height cannot be utilized efficiently all the way up to the ceiling. The arrangement of the compartments along walls and in free-standing rows on the floor, moreover, implies that large areas must be used as passageways and free areas. Furthermore, writing places, often in the form of booths, must be made available to the customers, and of the vault space only a total of 15–20% can be utilized for the compartments proper.

As bank offices usually are located in central places with high rents, the vault costs are correspondingly high. The vaults per se involve high structural costs in view of their wall thickness, heavy weights and resulting necessary foundation reinforcement. The vault, furthermore, should be located in close connection to the counter-hall and preferably on the same floor, all for the customers' comfort.

It is, therefore, a matter of great interest to be able to better utilize the vault volume and to use for the vault a place in the building which is less expensive, for example below the counter-hall or farther away therefrom.

It is today a frequently arising problem that the vault of the bank office is filled with conventional compartments. So as to continue this activity and to render the service demanded by the customers, an expansion of the vault facilities in some way is necessary. Such an expansion involves, in this situation, costs which practically in any case are entirely out of proportion.

The main objects of this invention are, firstly, to substantially increase the utilization degree of the vault space by the handling of deposits in the vault automatically and thereby utilize the vault height up to the ceiling, reduce the width of the passageways to a minimum and eliminate the need of writing places in the vault. Secondly, to use for the vault such spaces, which are located farther away in vertical, longitudinal or lateral direction and, therefore, less expensive, but nevertheless to offer the customer deposition service in a central place of the counter-hall. Thirdly, to handle the deposits in an automated manner with maintained safety requirements for the customer as well as the bank.

It is a further object of this invention to prevent queque formation when the boxes are handed in and to guard against storage in a wrong storage magazine of boxes handed-in in a wrong hand-in opening. Another object is to render it possible to adjust the positions of the box stands in the room so as to adapt these positions to the stacker irrespective of deviations in the distances from different compartments to the stacker, which deviations may be caused by the storage room. A still further object is to establish forcibly determined resting positions for the boxes in the box stands. The present invention also relates to an improved design of the stacker forks and grapple means and to a design of the boxes modified accordingly.

An automated customer vault with a handling system according to the invention permits utilization of a degree of volume of 50–70 % and comprises the following main parts: boxes with locks, box stands, one or more stackers for transports in the vault, a vertical conveyor for possible interfloor-transports, hand-out and hand-in opening, a control device for operating stacker and other automatic equipment, a register for automatic recording of number and time of hand-out and hand-in of boxes, and a control panel and/or identity card readers on the counter.

The invention is described in greater detail with reference to the accompanying drawings.

FIG. 2 is a perspective view of another embodiment, with the vault located below the counter-hall.

Figures 3A, 3B, 3C:
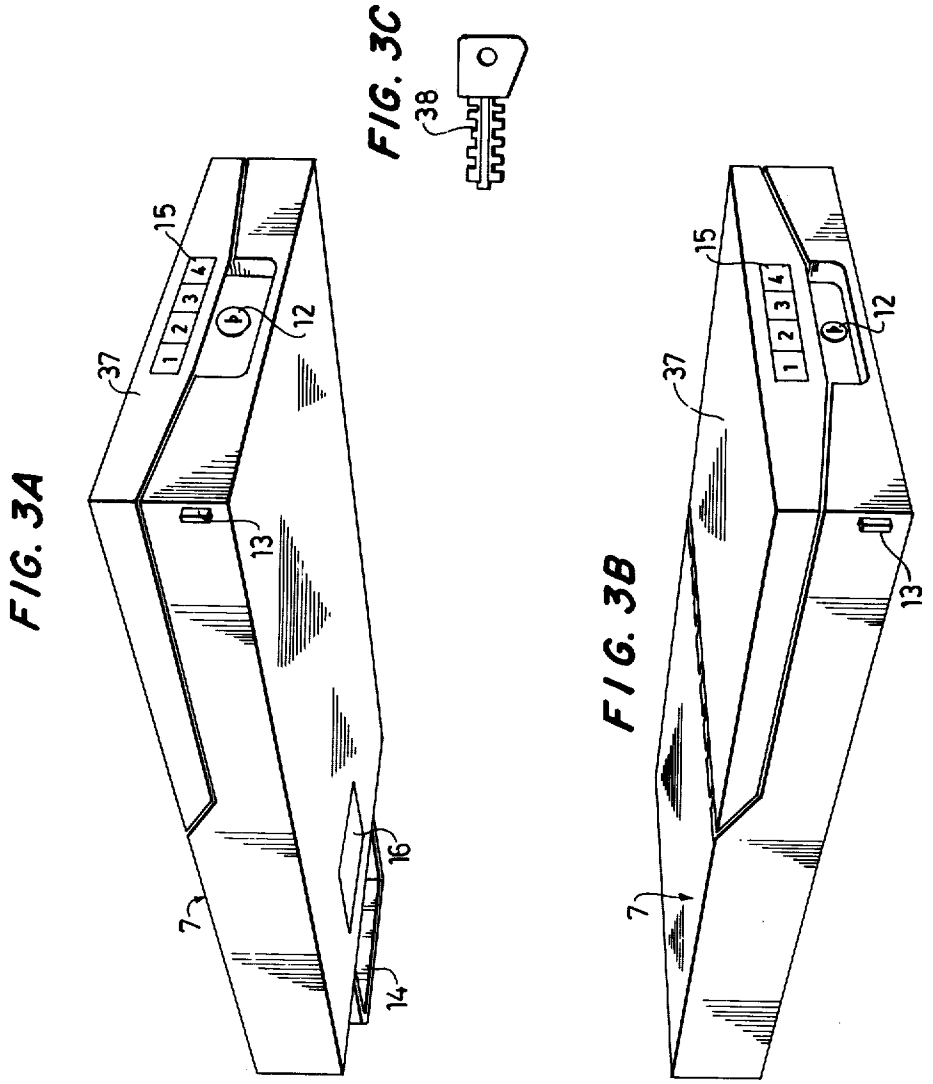

FIGS. 3A and 3B each shows perspective view of a deposit box.

FIG. 3C is a view of a key for a deposit box.

Figure 4:
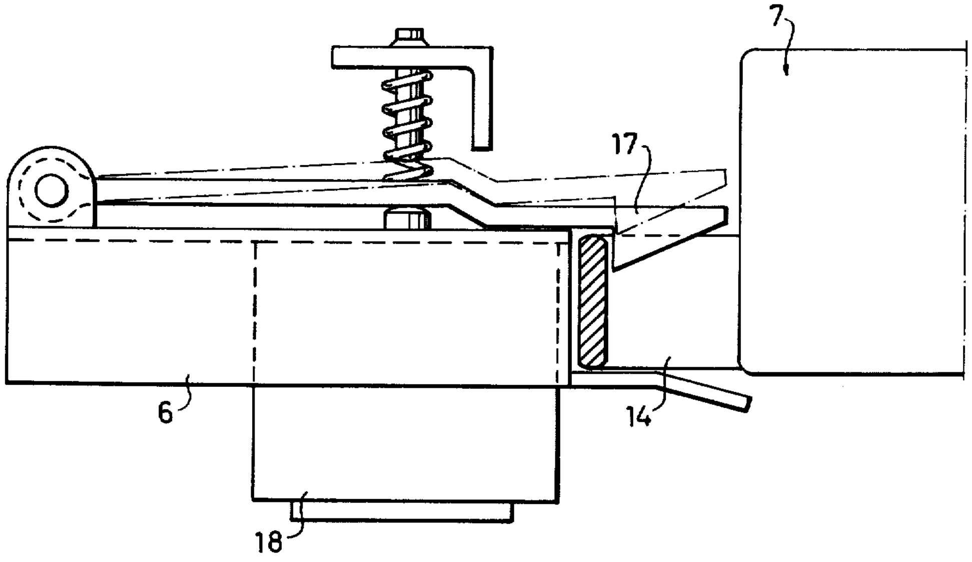

FIG. 4 shows the grapple means of a stacker.

Figure 5:
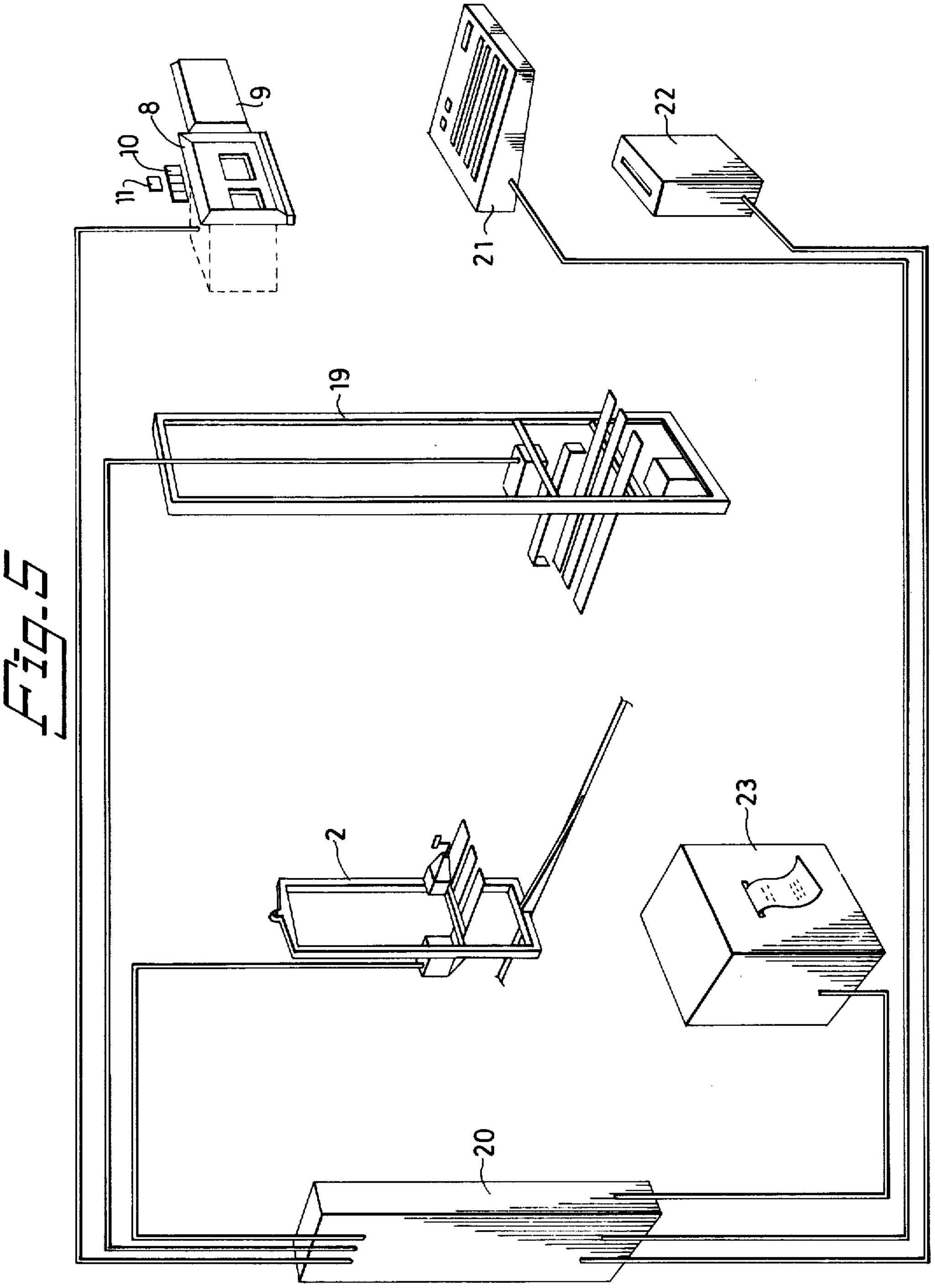

FIG. 5 is a basic view of units in the automated vault.

Figure 6B:
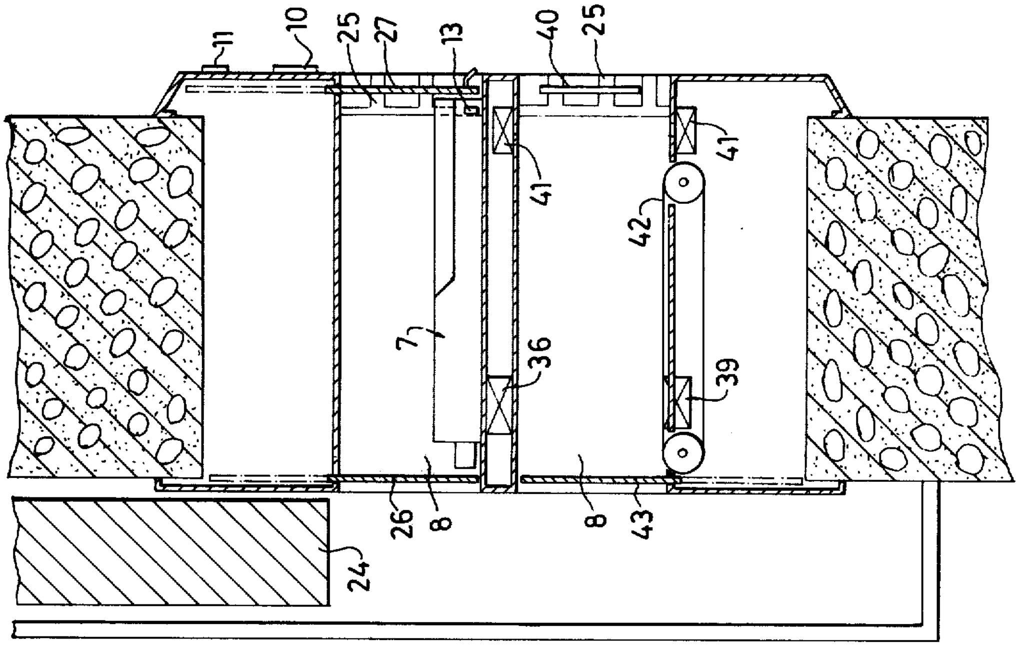
Figure 6A:
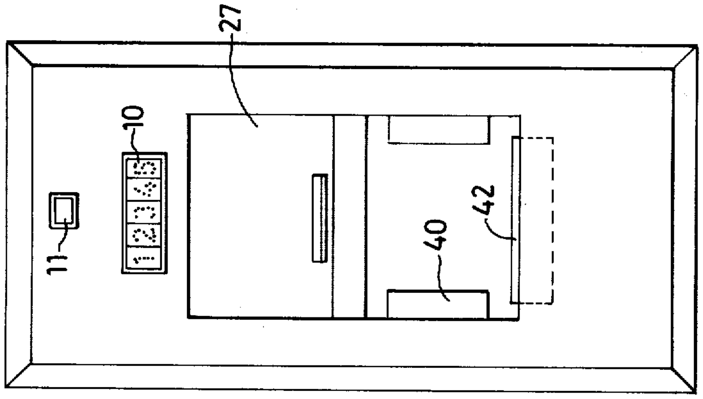

FIG. 6A is a front view of a hand-out and hand-in opening according to the present invention.

FIG. 6B is a sectional side view of a hand-out and hand-in opening according to the present invention.

Figure 7:
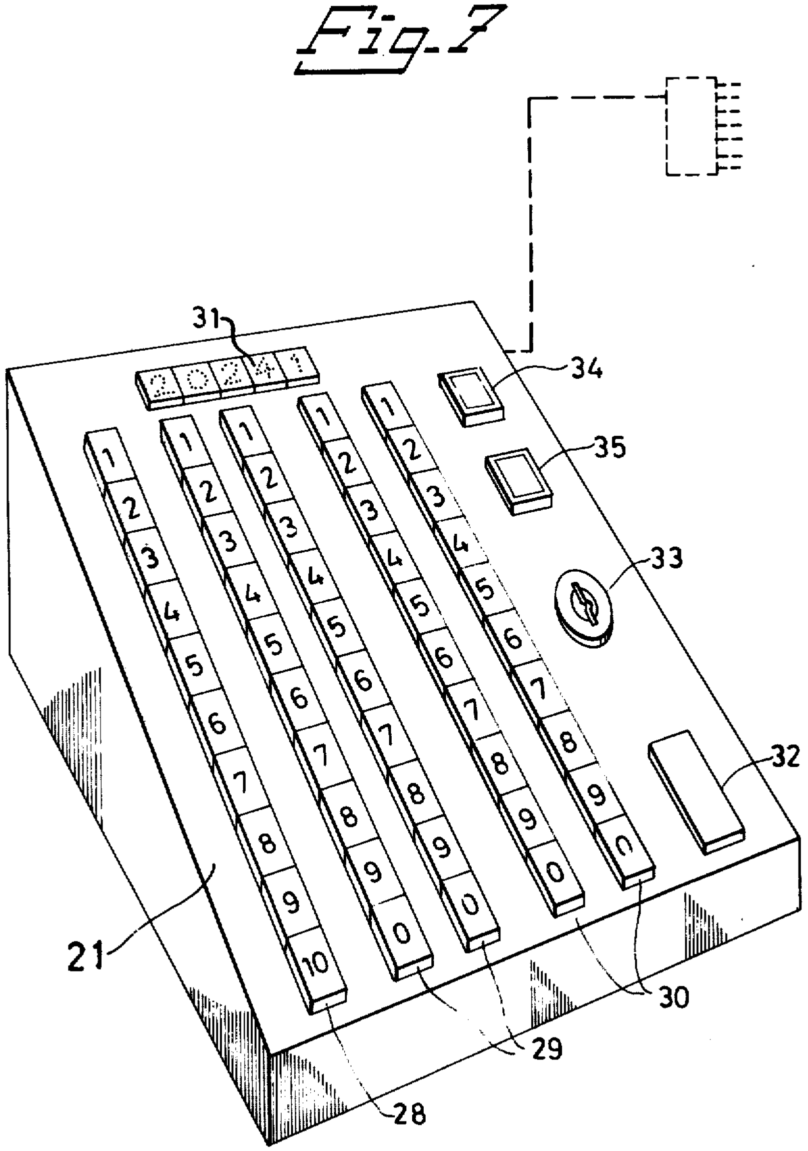

FIG. 7 shows a control panel.

Figure 8:
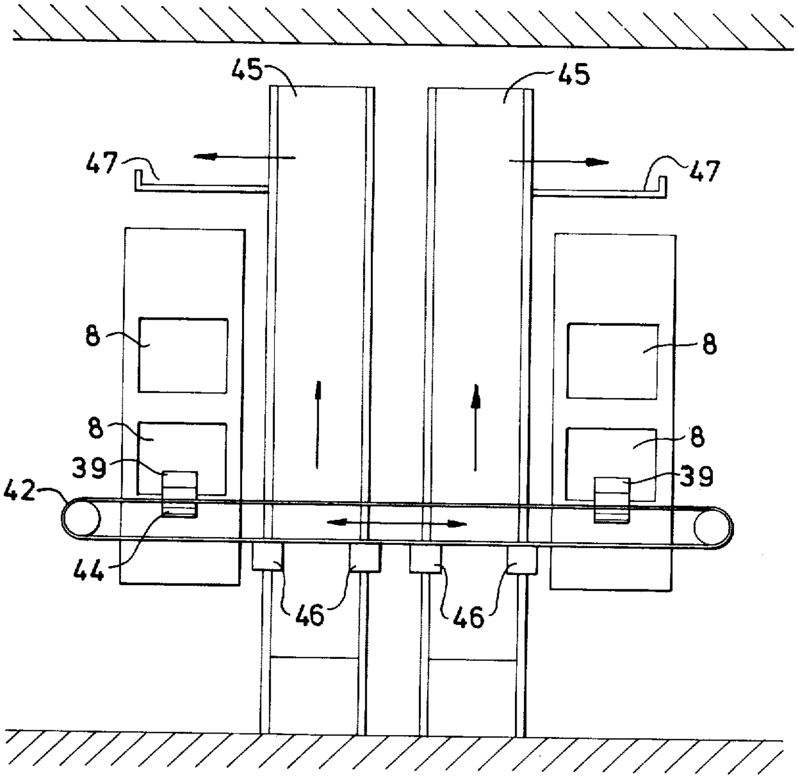
Figure 9:
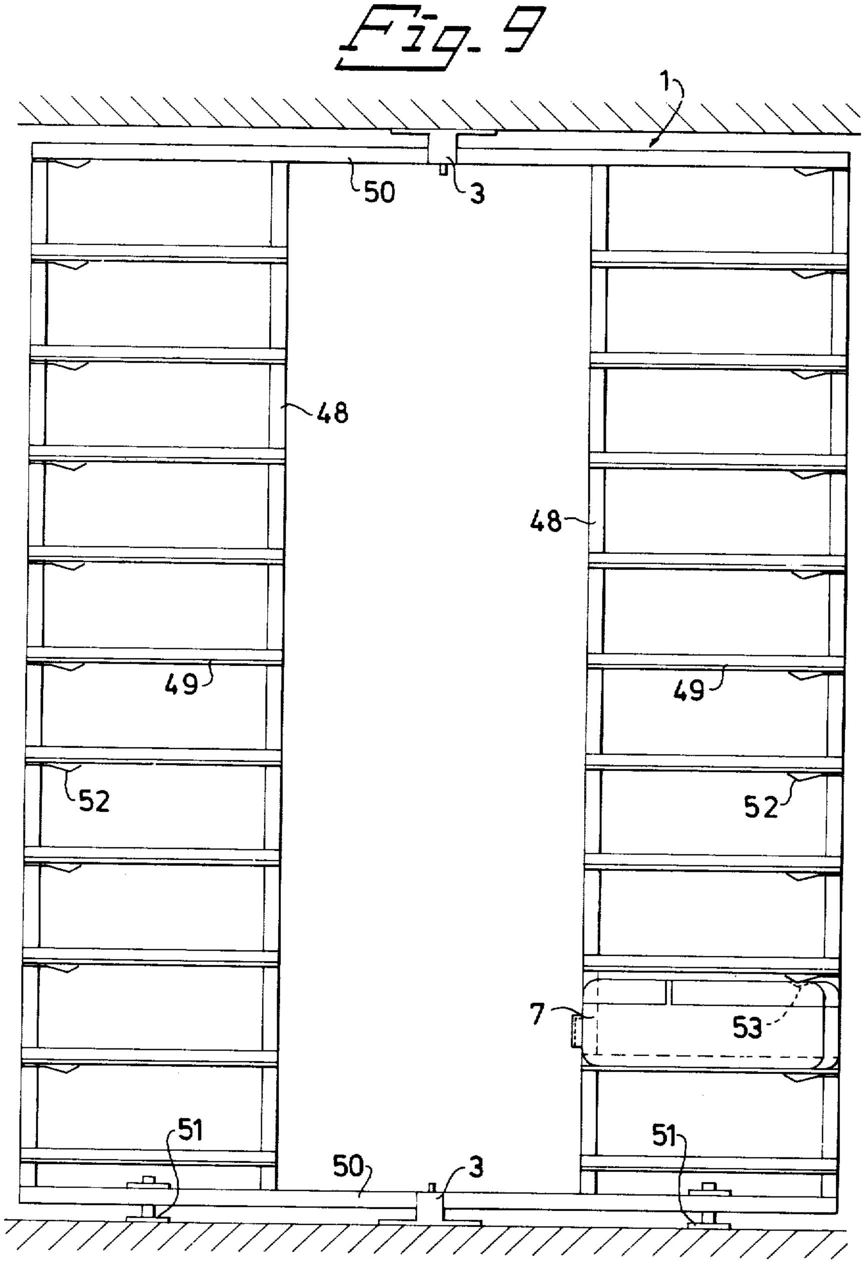

FIG. 8 is a view from the vault interior of a combined sorting and storing means.

Figure 9:
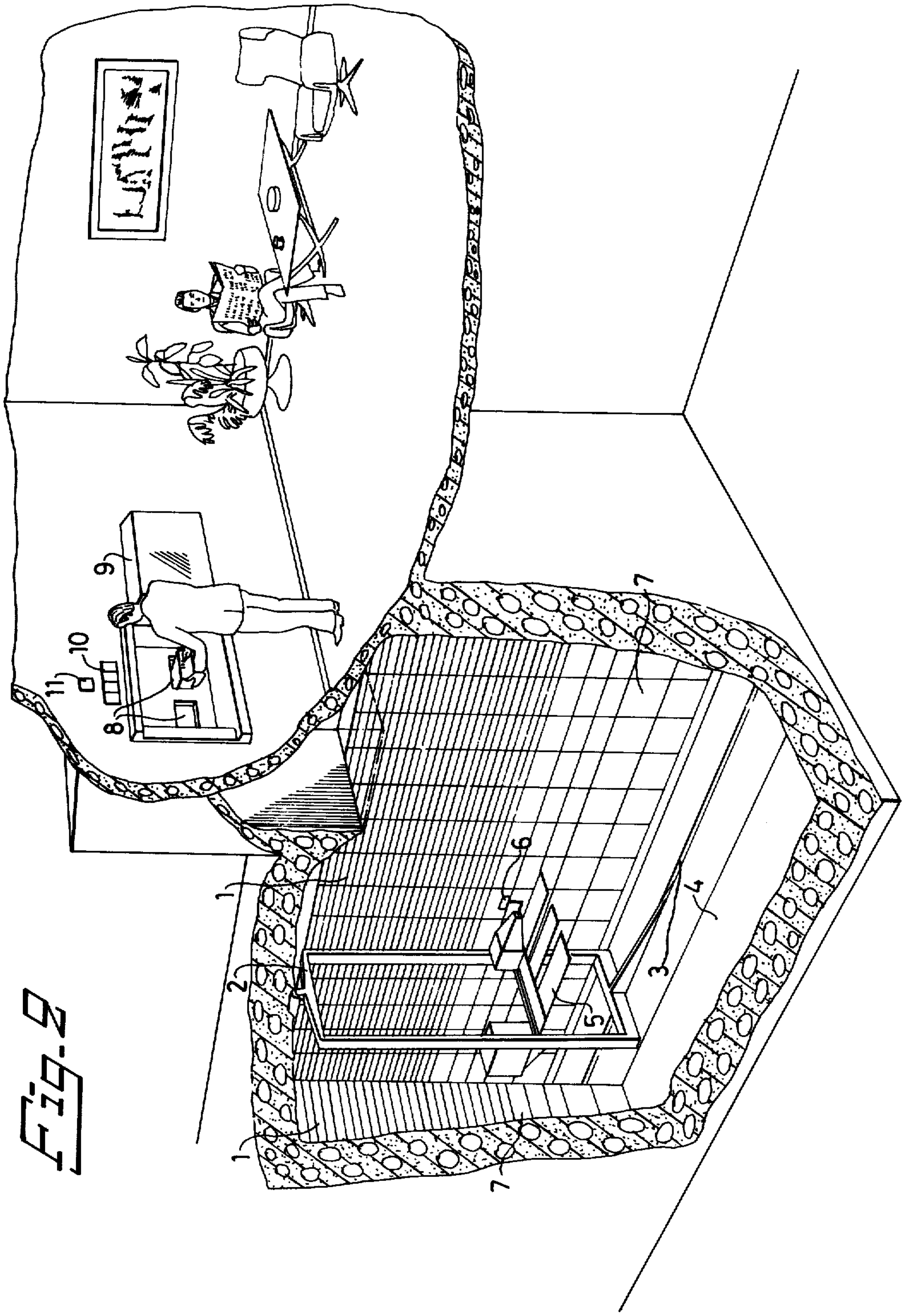

FIG. 9 shows a section through a box stand.

Figure 10A:
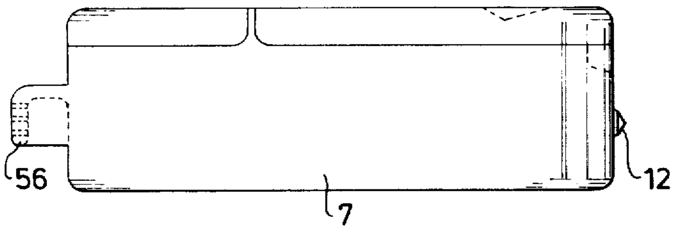

FIG. 10A is a side-view of a modified deposit box.

Figure 10B:
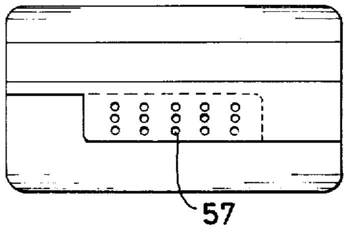

FIG. 10B is an end view of the deposit box of FIG. 10A.

Figure 10C:
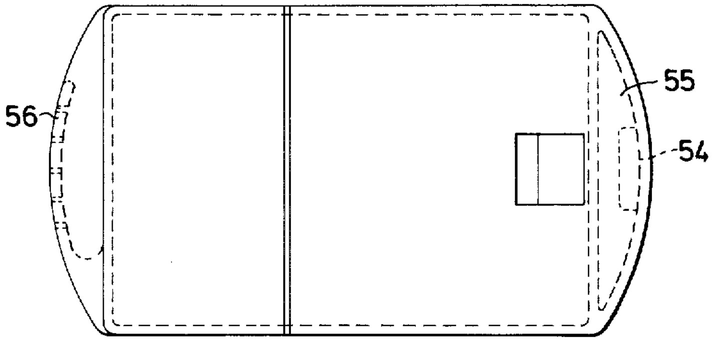

FIG. 10C is a top view of the deposit box of FIG. 10A.

Figure 11A:
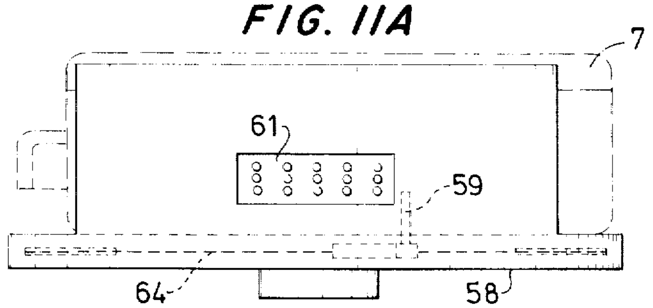

FIG. 11A is a side view of a swing-table adapted to the box in FIG. 10A and intended to replace forks and grapple means.

Figure 11B:
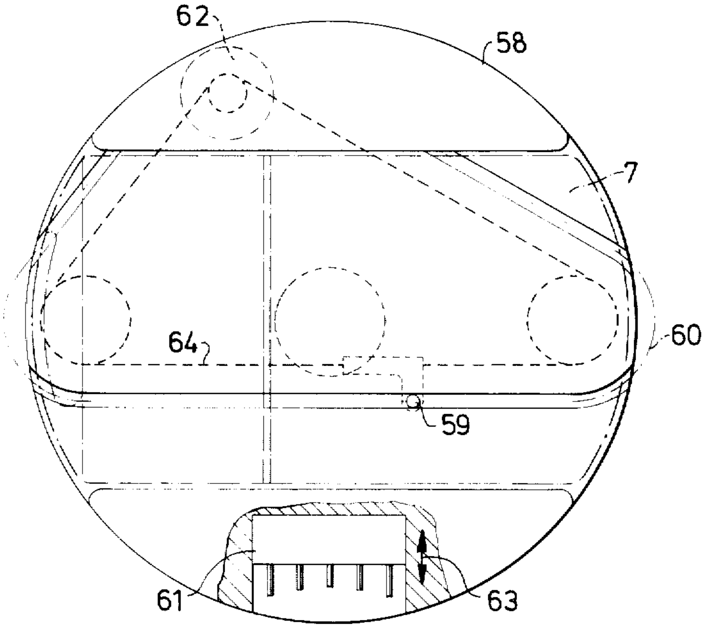

FIG. 11B is a top view of the table of FIG. 11A.

Figure 1:
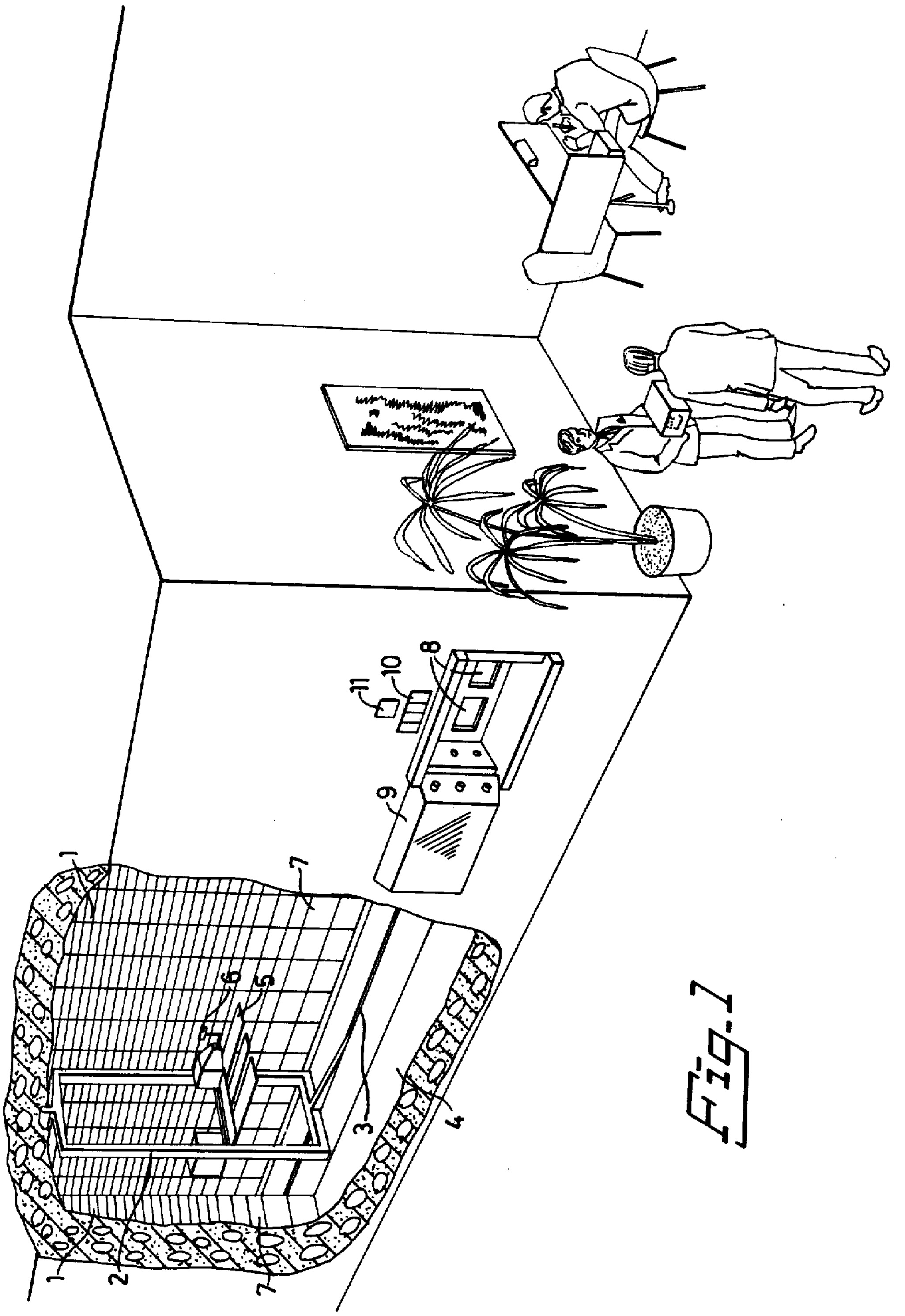
FIG. 1 is a perspective view of an embodiment of the invention, with the customers' vault located on the same floor as the counter-hall.

FIGS. 1 and 2 show box stands 1, a stacker 2, a groove 3 in the floor 4 for guiding the stacker 2, stacker forks 5 with grapple means 6, deposit boxes 7 in the box stands 1, a hand-out and hand-in opening 8 inside of a vault cover 9 being open during the day-hours, and above said cover a visual reproduction device 10 and a signal lamp 11. The deposit boxes 7 are located in the stands 1 in compartments, the height of which corresponds to the deposit box in question. The stands as shown form a frame-work extending in height to the ceiling of the vault. Between two stands 1 facing towards each other the stacker 2 may run in a groove 3, on rails in the floor and/or in corresponding recesses in the ceiling between the frame-works. The forks 5 of the stacker, or its table, are vertically movable from the floor 4 to the ceiling. The forks 5 are capable by means of an electromechanical device to take out and insert the deposit boxes in their places in the framework. The stacker 2 further can transport the deposit boxes to and from a conveying means of a kind other than the stacker and there unload and, respectively, load the deposit boxes. The stacker 2 may fetch and deliver deposit boxes at any place in the framework as well as from and, respectively, to the conveying means. According to FIG. 1, the stacker 2 transports the desired deposit box to the hand-out compartment at 8 where the box can be taken out by an authorized person (the customer who has hired the deposit box). In FIG. 1, the hand-out and hand-in opening 8 is located directly in the vault wall, and the stacker 2 alone carries out all transports to and from said opening. The opening 8 also includes a hand-in compartment for returning the deposit box. The stacker 2 can return a handed-in deposit box directly to its definite place in the framework or to the first place becoming empty, in which latter case the device is provided with a memory means for recording this place.

FIGS. 3A and 3B show a deposit box 7 with a lock 12, projecting bolts 13, a rearwardly located bracket 14, a visual numbering 15 forwardly on the cover, and an inductive number transmitter 16 built-in in the bottom. The owner of the deposit box alone has a key 38 for the lock 12 to open the box. This key is used also for actuating the bolts 13 in the way described below.

FIG. 4 shows how the grapple means 6 on the stacker forks 5 with a hook 17 by actuation of an electromagnet 18 retains the deposit box 7 in its bracket 14.

FIG. 5 is a basic view of the invention and shown the main parts of the system, viz. a stacker 2, a vertical conveyor 19, a control unit 20, a hand-out and hand-in opening 8, a control panel 21, an identity card reader 22 and a number/time register 23. The vertical conveyor 19 is an example of the aforementioned transport means of a kind other than the stacker.

FIG. 6A is a front view and FIG. 6B is a sectional side view of hand-out and hand-in openings 8 where the vault cover 9 according to FIGS. 1 and 2 is replaced by a sliding shutter 24 on the inside of the vault, and the openings for hand-out and, respectively, hand-in are located above each other. It also is apparent from FIG. 6A and 6B how a deposit box 7, which is standing between an inner forcibly controlled cover 26 and an outer liftable cover 27, can be locked with its projecting bolts 13 in special recesses 25 in the wall of the opening. To the left in the Figure, the arrangement in question also is shown in a front view.

FIG. 7 shows a control panel 21 suitable for the invention, comprising a number row 28 for the selection of a box stand row, two number rows 29 for x-address (99 possible compartment columns in longitudinal direction), two number rows 30 for y-address (99 possible compartment modules in vertical direction), a visual reproduction device 31 for control of the number keyed in, and an execution button 32 for starting a hand-out cycle. The control panel further is provided with a key switch 33 to prevent unauthorized use, with signal lamps 34 and 35 showing whether the system is connected for operation, and with an emergency stop when the safety disconnecting switch, fuse or the like are released. The execution button 32 has a built-in signal lamp, which shows whether the stacker is operating. The control panel preferably is operated by a member of the bank staff, but in certain cases the deposit box owner, by means of his identity card (ID-card) and a personal code, may be given the opportunity of operating the entire system by himself.

Briefly the operation of the system is as follows.

After the identity of the customer has been checked in the usual way by a bank staff member, or the identity card of the customer has been approved by the card-reader 22 on the counter, the staff member keys in the deposit box number 15 of the customer on the control panel 21 and starts the hand-out cycle with the execution button 32. This moment, as already mentioned, may possibly be carried out by the customer alone, without personal contact with the bank personnel. The stacker 2 in question receives now via the control unit 20 an address where a deposit box 7 is to be fetched. The height of the box amounts to a definite number of modules. Simultaneously therewith the inner cover 26 is lifted electromechanically at maximum, and the deposit box number 15 is shown in the device 10 on the front side of the hand-out and hand-in opening. The outer cover 27 is still locked and closed. After the stacker has arrived at said address, where it turns its grapple means 6 to the right direction, the stacker moves in, catches with its hook 17 the deposit box 7 at its bracket 14, pulls out the box and turns it into the driving direction. After the stacker 2 has arrived at the ordered address, the control unit 20 directs the stacker after a fixed program, which continues in that the stacker 2 brings the deposit box 7 onto the right level for the hand-out opening 8 where it puts down the box 7, but without releasing it. In this position the inductive number transmitter 16 of the deposit box is checked by a reader 36. If the deposit box has the correct number, the grapple means 6 of the stacker disengages from the bracket 14 of the deposit box, and the stacker 2 moves away. The inner cover 26 is closed and locked, the outer cover 27 is released to a lifting height corresponding to the height of the deposit box, and the signal lamp 11 on the front side of the hand-out and hand-in opening is lightened to indicate that the deposit box with the ordered number is available for hand-out. The customer in question can now lift the outer cover 27 so as to render possible a visual control of the number 15 on the cover 37 of the deposit box and thereafter, by his personal and unique key 38, change the position of the projecting bolts 13 of the deposit box so that the box can be taken out. Simultaneously therewith, the number 15 of the deposit box, the date, the hour and full minute, and the hand-out are recorded in the time register 23 of the system. When, however, the reader 36 reads a number 15 on the inductive number transmitter 16 which is different from that having been keyed in, the stacker 2 takes back the deposit box 7 and transports it to the address read last, if this address is not occupied, or otherwise puts down the deposit box in a reserve space. A deposit box, which has been directed to its place of hand-out and is not fetched there within an adjustable time, for example one minute, is taken back. At the same moment when the stacker 2 starts a return transport, the outer cover 27 is locked, the number 15 on the reproduction means 10 of the hand-out and hand-in opening 8 and the signal lamp 11 extinguish, and the inner cover 26 is opened fully.

The return transport of the deposit box from the hand-out compartments can be ordered by a bank staff member from the control panel. This may be the case, for example, when a customer does not go directly from the receiving place of the bank (control panel) to the hand-out compartment, so that a subsequent customer may arrive there earlier and a "wrong" deposit box might be available for fetching.

At the return of the deposit box into the opening concerned, the position of the projecting bolts 13 on the deposit box 7 must also then be changed for rendering it possible to push the box into the opening. In this position of the box, bars 40 move outwards and prevents the box from being taken back. A photocell 41 checks that the key 38 has been removed, a reader 39 reads the number transmitter 16 of the deposit box, and a new recording of number and time takes place in the time register 23 of the system. After the cover 43 has moved aside, a built-in conveyor transports the deposit box to a magazine, from which the stacker 2, when it is not occupied with hand-out transports, automatically transports the deposit boxes in proper order back to their respective addresses.

The electric control equipment may, as already mentioned, be provided with a memory unit, which a.o. stores empty framework places and at box return directs the stacker to the nearest empty compartment for the deposit box size in question, and which also stores impulses from the control panel.

The customer coming to the hand-out compartment may release the transport of the deposit box to the compartment, by keying-in a number on a keyboard or by his identity card in a card reader, possibly combined with the keying-in of a personal code. The deposit box, however, cannot be taken out of the hand-out compartment without using the key for the deposit box.

FIG. 8 shows from the vault interior — from the left-hand side of the section in FIG. 6 — two pairs of hand-in and hand-out openings 8, which are provided with a combination of a sorting means 44 and two storing means or return magazines 45. A highly desired object of a system according to the invention is to prevent queque formation at the hand-in of deposit boxes 7. Since the hand-out of deposit boxes is given priority over the hand-in of deposit boxes with respect to the function of the stacker 2, it happens at times that deposit boxes handed-in must temporarily be stored in a special storage magazine (return magazine), because the stacker is occupied with the transport of deposit boxes to different openings where they are to be handed-out.

FIG. 8 shows a total of two return magazines 45 for this purpose, viz. one for the right-hand hand-in opening (the lower one of the two openings 8) and one for the left-hand hand-in opening. The return magazine operates according to the endless chain conveyor principle and feeds successively deposit boxes handed-in to an upwardly located return place 47. First after having carried out all hand-out orders, the stacker fetches from said return place the deposit box stored there for returning it to its place in the deposit box stand, and the next deposit box possibly stored in the return magazine is fed upwards to the empty return place 47.

It may easily happen in practice that deposit boxes 7 are handed-in to a hand-in opening 8, which does not correspond to the hand-out opening 8 from which the deposit box had been taken earlier. This implies that this hand-out opening will not correspond to the number (the inductive number transmitter 16 of the deposit box) of the handed-in deposit box in question. In order to prevent complications of such an incorrect hand-in, according to the invention the number of the deposit box is read by the reader 39 immediately at the hand-in of the deposit box, and the control unit 20 orders a sorting device 44 to convey the deposit box in question to the return magazine 45 corresponding to the number of said deposit box. The sorting device shown in FIG. 8 comprises a transverse conveyor with reversible movement and electricaly controllable stop bosses 46. 42 designates the conveyor shown in FIG. 6 for transporting the handed-in deposit box to said transverse conveyor 44.

FIG. 9 shows the structural design of the deposit box stands. The stands are assembled of frames 48 with angular brackets 49 supporting the deposit boxes 7. The frames 48 are tied to a groove or rail 3 in the floor and, respectively, ceiling of the room (vault) by means of distance legs 50. The frames 48 of the stands 1 are adjustable to correct position by means of adjustable feet 51. It may happen that the groove or rail 3 in the ceiling and the corresponding groove or rail in the floor are not positioned accurately vertically above each other, and as said grooves or rails are intended to guide the stacker 2, the stacker will assume an oblique position, with the result that the distance from the stacker to different deposit boxes 7 supported on the brackets 49 will be different. This is, of course, detrimental for accurately inserting the deposit boxes into and removing them from the stands. It is easily understood that the arrangement shown in FIG. 9 provides the advantage of rendering it possible to adjust the stands so as to have the same constant distance throughout to the stacker.

According to FIG. 9, the angular brackets 49 on the frames 48 have resilient tongues 52, which are capable to press the deposit box 7 in question down against the support and thereby give rise to a certain friction independently of the load of the box. The resilient tongues 52, further, are so arranged that they move down into a shallow recess 53 in the upper edge of the deposit box when the box has assumed its correct position on its bracket. The object of the tongues is to secure the position of the box on the bracket even if the deposit box 7 lies in its compartment for a long time without being taken out, irrespective of vibrations, which may be produced by the stacker in motion and possibly by a heavy traffic in the vicinity of the vault.

FIGS. 10A, 10B and 10C show an alternative embodiment of the deposit box 7 compared with the box design shown in FIG. 3A, 3B and 3C. According to the invention, the forward and rearward edges of the deposit box are arc shape to adapt to the alternative design of the deposit box grapple means described below in conjunction with FIGS. 11A and 11B. The forward edge segment formed thereby is used as a handle 54 and as space for the deposit box lock 12 and a bolt mechanism 55. As seen in FIG. 10C the rearward edge segment forms a bow 56 being open to one side (upwards in the lower view in FIG. 10), and the deposit box has a code number 57 in the form of perforations, of which certain holes are plugged after a special code plan when the deposit box is being given its number. The grapple means cooperates with the bow 56 as will become apparent from the following. By means of the shown design of the deposit box 7, the box size and the space between the stands 1 for the stacker 2 can be reduced to a minimum. This space is determined substantially by the diagonal measures of the deposit box.

The design of the grapple means of the stacker 2 adapted to the deposit box according to FIGS. 10A, 10B and 10C appear from FIGS. 11A and 11B. The stacker described above comprises forks 5 and grapple means 6 (see e.g. FIG. 2). At the embodiment according to FIGS. 11A and 11B the forks and grapple means have been replaced by a swing-table 58 with a catch arm 59, which latter at the fetching and delivery of a deposit box 7 can operate outside the circumference of the swing-table 58 as shown in FIG. 11B by the dash-line curve 60. This operation is necessary for providing free space between the deposit boxes 7 and the swing-table 58 when the stacker 2 moves within the automated handling system according to the invention.

The two segments of the swing-table 58, which are not reserved for the transport of deposit boxes 7, are used to provide space for a reader 61 movable according to the double-screw 63 shown downwardly in FIG. 11B and for a drive motor 62 for the catch arm 59. The reader 61 preferably operates with needles, which inductively actuate coils or magnetically actuate tongue elements at the reading of the code number 57 of the deposit box in question. The drive motor 62 drives the catch arm 59 by means of a drive chain 64 (dash-line in FIG. 11B).

In order to determine the position of the stacker 2, a rotary inductive impulse transmitter can be used which rotates on a rack along the rail 3 in FIG. 2. The control unit 20 then senses continuously the number of impulses to be produced additionally by the stacker 2 before its arrival at the ordered address. The control equipment actuates a thyristor-controlled D.C. traction motor to maintain correct speed at every occasion.

The said control equipment includes a fixed program memory for the entire system with respect to standard routines and localizations of different details. Advantageously, it also includes a variable memory, for example with respect to special or temporary orders to individual deposit boxes, because at times the permission of access to a definite deposit box must not be given to one person, but the hand-out of the deposit box requires the presence of two persons. Such a situation preferably is indicated to an operator at the counter by e.g. visual reproduction. Another situation which may occur is that the access to a definite deposit box temporarily is blocked, for example, in the case of an unsettled estate of a deceased person, for which purpose the variable memory in the control equipment also is used. In conjunction with visual reproduction may be mentioned, that at the operator's place, preferably, the number of the deposit box and the hour of hand-out and hand-in are reproduced visually, but that the reproduction device 10 (see FIGS. 1 and 2) only reproduces the turn number, which the customer in question has been given by the operator, but not the number of the deposit box in question.

Details and specific arrangements may be varied widely within the scope of the invention. The control unit 20, for example, may preferably be provided with a memory, due to the function of which deposit boxes always are returned to the first empty space in the box stand 1. This would in rapidly operating systems save access time. Furthermore, different forms of checking the customer's identity may be applied and, consequently, different components for ordering the hand-out of a deposit box be used. Specific local problems may also demand different types of conveyor and sensing means to ensure satisfactory operation. The size of the systems may vary considerably, too, and a doubling of components and units probably will be very usual.

I claim:

1. In a system for the automatic programmed handling of coded safety deposit boxes and other objects having book receiving members and stored in a storage room having rows of shelves, the improvement which comprises stacking means movable along said shelves for the removal and insertion of said boxes, gripping means movably mounted on said stacking means for movement in the vertical direction and on the horizontal plane for removal and insertion of said boxes, said gripping means including hook means for communication with said hook receiving means of said boxes for transporting said boxes, programming means cooperating with said stacking means and said gripping means for automatically directing said stacking means and said gripping means to a desired box by way of a predetermined program, said programming means including control means for keying-in the desired box and initiating box hand-out and hand-in positions, transport means for transporting a handed-in deposit box to a temporary storage magazine for subsequently returning said box by means of stacking means to a storage position, and at least one issuing and receiving opening disposed adjoiningly in the wall of said storage room for receiving and returning said boxes, whereby upon receipt of instructions by the programming means of the desired box, the stacking means is actuated and moves automatically along the shelves to the proper position, the gripping means at the proper location engages or disengages the hook means and the hook receiving means in the box hand-out and hand-in positions and delivers or retrieves the box at the issuing and receiving openings.

2. A system according to claim 1 including a time register for recording the deposit box number, date and hour of hand-out and hand-in of deposit boxes.

3. A system according to claim 1 including a hand-out opening formed with an inner cover and an outer cover so that by coaction of the covers relative to each other a free view into the storage room is prevented in all positions.

4. A system according to claim 3 wherein the hand-out opening is so formed that the outer cover can be lifted first after a reader has checked that the box has the correct number.

5. A system according to claim 3 including lock means on said box and wherein the box is provided with projecting bolts which together with grooves in the hand-out opening render it impossible to take out the box unless by means of the lock means the position of the projecting bolts has been changed.

6. A system according to claim 5 wherein the lock means of the box both actuates the projecting bolts and acts as a lock for the cover of the box.

7. A system according to claim 6, including a photocell attached in the hand-in opening to indicate that the key of the box has been taken out of its lock.

8. A system according to claim 1 including an inductive number transmitter on said box and said reader co-acts with said inductive number transmitter on the box.

9. A system according to claim 8, including a second reader for reading the deposit box number at the hand-in.

10. A system according to claim 5 including reading means for said lock means for actuating said means when a box is being read.

11. A system according to claim 2 including means for transferring the box number to the time register.

12. A system according to claim 1, wherein each hand-in and hand-out opening is provided with a return magazine for temporary storage of boxes in the event of accumulation of such boxes at the opening in question.

13. A system according to claim 12, including a reader for reading the number of the box at its hand-in into a hand-in opening and to direct a sorting device to deliver the box to a return magazine corresponding to a box number.

14. A system according to claim 13, wherein said return magazine is provided with a return place from which the stacking means fetches boxes and returns them to a box stand.

15. A system according to claim 1 wherein said box is provided with a bracket adapted to co-act with a catch arm at a fetch and delivery means in the form of a swing-table, which bracket is open to one side so that the catch arm at the delivery of the box during a swinging motion can be released from said box and swing inwards inside the circumference of a swing-table.

16. A system according to claim 15, wherein the swing-table is provided with a movable reader.

17. A system according to claim 15, wherein the catch arm is arranged to swing at the fetching and delivery of boxes outside the circumference of the swing-table to fetch and, respectively, deliver the box at a definite distance outside said circumference.

18. A system according to claim 1, including an impulse transmitter adapted to rotate on a rack along a rail guiding the movement of the stacking means for determining the present position of the stacking means along said rail.

19. A system according to claim 18, wherein said control means is arranged to continuously have in memory the distance of the stacking means to the position of the box ordered, by determination of the number of the remaining impulses from the impulse transmitter until arrival of the stacking means at said address, and to actuate a D.C. motor with thyristor control driving the stacking means to have at any moment a suitable speed.

20. A system according to claim 19, wherein said control means comprises both a fixed program memory and a variable memory.

21. A system according to claim 20, wherein the variable memory of the control means renders possible the recording of special programs referring to special conditions to be met by the deposit box owner for the permission of box hand-out.

* * * * *